(12) United States Patent
Nguyen

(10) Patent No.: US 6,611,397 B1
(45) Date of Patent: Aug. 26, 2003

(54) SERVO BURST PATTERN DEFECT DETECTION

(75) Inventor: Hieu V. Nguyen, Oklahoma City, OK (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/326,068

(22) Filed: Jun. 4, 1999

Related U.S. Application Data (60) Provisional application No. 60/088,078, filed on Jun. 5, 1998.

(51) Int. Cl.[7] .............................................. G11B 5/596
(52) U.S. Cl. ..................... 360/77.08; 360/25; 360/31; 360/77.06
(58) Field of Search ................ 360/25, 77.08, 360/77.05, 50, 77.06, 31

(56) References Cited

U.S. PATENT DOCUMENTS

| | | | |
|---|---|---|---|
| 5,262,907 A | 11/1993 | Duffy et al. | |
| 5,483,393 A | 1/1996 | Mento et al. | |
| 5,710,677 A | 1/1998 | Teng et al. | |
| 5,793,559 A | 8/1998 | Shepherd et al. | |
| 5,796,543 A | * 8/1998 | Ton-That | 360/77.08 |
| 5,815,332 A | 9/1998 | Suzuki et al. | |
| 5,825,318 A | 10/1998 | Patapoutian et al. | |
| 5,867,341 A | * 2/1999 | Volz et al. | 360/77.08 |
| 5,870,243 A | 2/1999 | Ukani et al. | |
| 5,889,631 A | 3/1999 | Hobson | |
| 5,930,068 A | * 7/1999 | Gregg et al. | 360/77.05 |
| 6,034,829 A | * 3/2000 | Suzuki et al. | 360/25 |

* cited by examiner

*Primary Examiner*—Regina Y. Neal
*Assistant Examiner*—Mitchell Slavitt
(74) *Attorney, Agent, or Firm*—Fellers, Snider, et al.

(57) ABSTRACT

Apparatus and method for improving operational performance of a disc drive by detecting defective servo burst patterns. A rotatable disc is provided with servo data which include a plurality of servo burst patterns to define a plurality of tracks. A head transduces the burst patterns to provide burst signals to a servo circuit which controllably positions the head with respect to the surface of the disc by determining a position error signal from a combination of the burst signals. The servo circuit identifies a selected servo burst pattern as defective in relation to differences between absolute values of successive pairs of peak amplitude samples from the burst signal.

12 Claims, 4 Drawing Sheets

SERVO BURST PATTERN DEFECT DETECTION

RELATED APPLICATIONS

This application claims priority to U.S. Provisional Application No. 60/088,078 filed Jun. 5, 1998.

FIELD OF THE INVENTION

The present invention relates generally to the field of disc drive devices and more particularly, but without limitation, to improving operational performance of a disc drive by detecting defects in servo burst patterns used to control the position of a disc drive head.

BACKGROUND OF THE INVENTION

Modern hard disc drives comprise one or more rigid discs that are coated with a magnetizable medium and mounted on the hub of a spindle motor for rotation at a constant, high speed. Data are stored on the discs in a plurality of concentric circular tracks by an array of transducers ("heads") mounted to a radial actuator for movement of the heads relative to the discs.

A voice coil motor (VCM) is used to position the heads with respect to the disc surfaces. The heads are mounted via flexures at the ends of a plurality of arms which project radially outward from an actuator body. The actuator body pivots about a shaft mounted to the disc drive housing at a position closely adjacent the outer extreme of the discs. The pivot shaft is parallel with the axis of rotation of the spindle motor and the discs, so that the heads move in a plane parallel with the surfaces of the discs.

The VCM includes a coil mounted on the side of the actuator body opposite the head arms so as to be immersed in the magnetic field of a magnetic circuit comprising one or more permanent magnets and magnetically permeable pole pieces. When current is applied to the coil, an electromagnetic field is set up which interacts with the magnetic field of the magnetic circuit to cause the coil to move relative to the permanent magnets, causing the actuator body to pivot about the pivot shaft and move the heads across the disc surfaces.

Head positional control is typically achieved with a closed loop servo circuit such as disclosed in U.S. Pat. No. 5,262,907 issued to Duffy et al., assigned to the assignee of the present invention. Such a servo circuit utilizes servo data written to the discs during the disc drive manufacturing process to detect and control the position of the heads through the generation of a position error signal (PES) which is indicative of the position of the head with respect to a selected track. The PES is presented as a position dependent signal having a magnitude indicative of the relative distance between the head and the center of a track and a polarity indicative of the direction of the head with respect to the track center. Thus, it is common for the PES to have normalized values corresponding to a range of, for example −1.0 to +1.0, as the head is swept across a selected track and to have a value corresponding to a value of 0 when the head is positioned over the center of the track. As will be recognized, modern servo circuits typically generate the PES as a sequence of digital samples which generally correspond to the above analog range.

The PES is generated by the servo circuit by comparing the relative signal strengths of burst signals obtained from precisely located magnetized servo burst patterns in the servo data on the disc surface. The burst patterns are generally arranged in an offset pattern so that, through sampling and algebraic combination of the burst signals, the relative position of the head to a particular track center can be determined and controlled.

More particularly, digital representations of the analog burst signals are provided to a servo microprocessor (such as a digital signal processor), which obtains a digital representation of the value of the PES from a selected combination of samples from the analog burst signals. The microprocessor then compares the value of the PES to a desired value indicative of the desired position of the head to the selected track and issues a digital correction signal to a coil driver, which in turn provides an analog current to the actuator coil to adjust the position of the actuator.

It will be recognized that accurate control of the position of the heads is of paramount importance in the reliable reading and writing of data to the discs. The servo circuit generally attempts to maintain the head over the center of the selected track so as to minimize the potential for overwriting data on adjacent tracks or having the magnetization of adjacent tracks interfere with the reading of the data stored on the selected track. Thus, it is common during read and write operations to compare the absolute value of each PES sample to a predetermined safe-threshold value in order to assure the head is correctly positioned relative to the track. Should the value of a particular PES sample exceed the threshold, the read or write operation is temporarily suspended until the PES is brought back down to a safe value. These thresholds are referred to as "read-fault" and "write fault" thresholds and will generally range from about 10% to 20% of the width of the track (as measured from the center of the track).

A selected PES sample may have a value that exceeds the safe-threshold value during a read or write operation for a variety of reasons. One such reason is that the head is actually positioned off track center a distance sufficient to exceed the threshold value; particularly, it will be recognized that mechanical shocks supplied to the disc drive during operation can result in movement of the head away from the center of the selected track (sometimes referred to as an off-track condition). As a result, it is desirable to suspend the read or write operation until such off-track condition can be corrected.

Another reason that a selected PES sample may have a value that exceeds the safe-threshold value is the existence of a localized defect in the servo data associated with the PES sample; in such a case, the head may be correctly located with respect to the track, but the reported PES sample erroneously indicates otherwise. Such a defect in the servo data can occur as a result of a localized anomaly in the media on the surface of a disc, so that the media does not possess the necessary magnetic properties to allow the servo data to be properly written at this location. Undetected errors can also occur during the servo track writing process during manufacture of the disc drive, so that incorrect servo data are provided to the disc at a particular location.

Heads that utilize magneto-resistive (MR) technology can also be affected by a phenomenon known as a thermal asperity, which can induce significant distortion in a read-back signal. An MR head utilizes a read element that undergoes change in electrical resistance in the presence of a magnetic field of selected orientation. By passing a bias current through an MR read element, the selective magnetization of the disc can be detected in relation to changes in voltage across the element.

However, very small defects on the surface of the recording discs can be large enough to physically contact the MR read element of the heads as the discs rotate under the heads. Such contact, while of very short time duration, results in frictional heating of the MR read element and the change of temperature brought about by the contact also produces a change in resistance in the MR element, distorting the readback signal. A similar effect can occur when the head contacts particulate contamination on the disc surface.

Small "hills" and "valleys" in the disc surfaces can also induce thermal asperity events even without physical contact between the MR element and the disc surface. Because the bias current applied to the MR element results in heating of the MR element, a thermal equilibrium is established in which the generated heat in the MR element is constantly dissipated from the MR element through other elements of the head assembly and, to a lesser extent, across the air bearing supporting the slider to the disc itself. Thus, disc surface variations that change the spacing between the MR element and the disc can induce attendant changes in the heat dissipation characteristics of the head, resulting in distortion in the readback signal obtained from the head.

Regardless of the source of the defect in the servo data, such a defect is typically manifested as a one sample error in the sequence of PES samples. The erroneous PES sample does not provide a true indication of head position relative to the center of the selected track, and further, if the erroneous PES sample is interpreted by the servo circuit as an impulse function, an unwanted oscillatory response will be induced into the system.

Because of the problems associated with defects in the servo data, it is desirable to provide a servo circuit which can detect the presence of a defective servo burst pattern and take the necessary steps to reduce the effects of such upon the operation of the drive. It is to these ends that the present invention is directed.

SUMMARY OF THE INVENTION

The present invention provides an apparatus and method for improving operational performance of a disc drive by identifying defective servo burst patterns used to effect head positional control.

In accordance with preferred embodiments, a disc drive is provided with a head which is supported adjacent a surface of a rotatable disc on which servo data are stored. The servo data include a plurality of servo burst patterns which define a plurality of tracks on the surface of the disc.

A servo circuit, responsive to the head, controllably positions the head with respect to the surface of the disc in relation to a position error signal determined from a selected combination of burst signals transduced from the servo burst patterns. Additionally, the servo circuit identifies a selected servo burst pattern as defective in relation to differences between successive pairs of peak amplitude samples from the burst signal obtained from the selected servo burst pattern.

More particularly, the servo circuit preferably comprises a servo processor having associated programming to determine a sequence of the peak amplitude samples from the burst signal, determine a sequence of difference values in relation to differences between absolute values of successive pairs of the peak amplitude samples, and compare the sequence of difference values to a defect threshold. The servo processor identifies the selected servo burst pattern as defective when at least one of the difference values exceeds the defect threshold.

The defect threshold is preferably provided with a magnitude to differentiate between burst signals with random noise fluctuations, and burst signals affected by a thermal asperity or localized media anomaly in the associated servo burst pattern.

These and various features as well as advantages which characterize the present invention will be apparent from a reading of the following detailed description and a review of the associated drawings.

DETAILED DESCRIPTION

Figure 1:
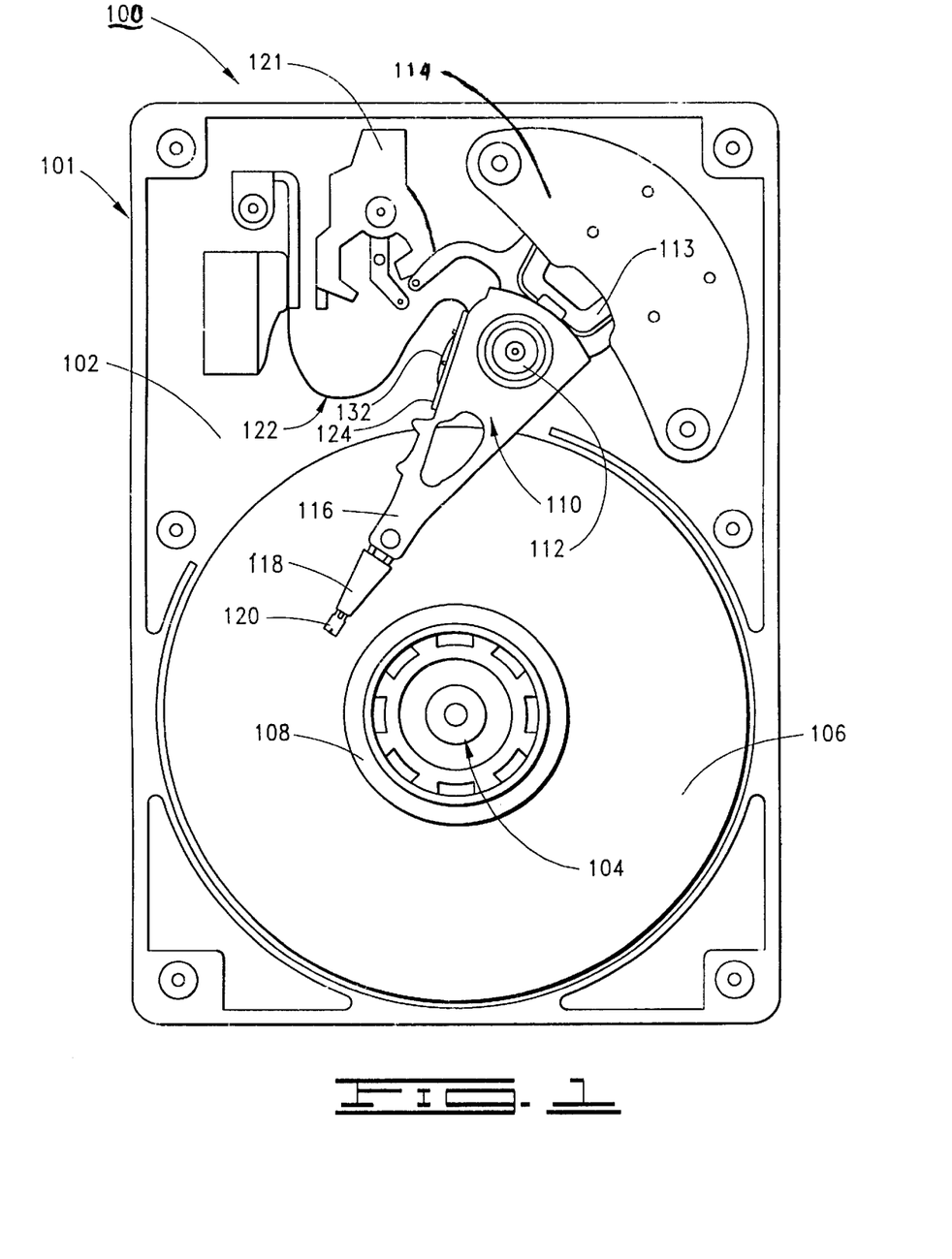
FIG. 1 provides a top plan view of a disc drive constructed in accordance with preferred embodiments of the present invention.

The present discussion will now turn to a detailed description of various preferred embodiments of the claimed invention. Referring first to FIG. 1, shown therein is a top plan view of a disc drive 100 used to store and retrieve computerized data.

The disc drive 100 includes a head-disc assembly (HDA) 101 and a disc drive printed wiring assembly (PWA) which is mounted to the underside of the HDA 101 and thus, not visible in FIG. 1. As discussed below, the PWA provides circuitry necessary to control the operation of the HDA 101 and to transfer data between the HDA 101 and a host computer in which the disc drive 100 can be mounted in a user environment.

The HDA 101 includes a base deck 102 to which various disc drive components are mounted. A top cover, which has been omitted from FIG. 1 to facilitate the present discussion, cooperates with the base deck 102 to form an internal, sealed environment for the disc drive 100. A spindle motor 104 is provided to rotate a stack of discs 106 at a constant high speed, with a disc clamp 108 securing the discs to the spindle motor 104.

To access the discs 106, a controllably positionable actuator assembly 110 is provided which rotates about a cartridge bearing assembly 112 in response to currents applied to a coil (a portion of which is shown at 113) of a voice coil motor (VCM) 114. The actuator assembly 110 includes a plurality of arms from which corresponding flexure assemblies extend, the topmost of which are identified at 116 and 118, respectively. Heads 120 are provided at distal ends of the flexure assemblies 116, 118 and are supported over the discs 106 by air bearings established by air currents set up by the rotation of the discs 106.

A latch assembly 121 is provided to secure the heads 120 over texturized landing zones (not shown) at the innermost diameters of the discs 106 when the disc drive 100 is deactivated. A flex circuit assembly 122 provides electrical communication paths between the actuator assembly 110 and the disc drive PWA and includes a flex circuit board 124.

Figure 2:
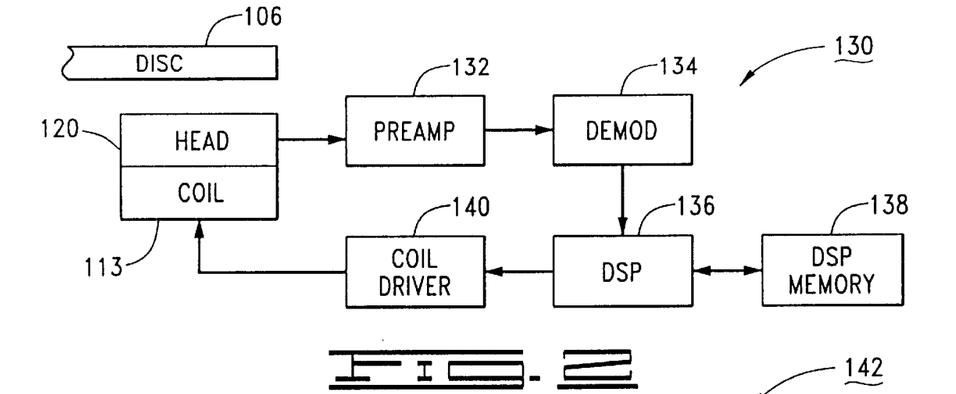
FIG. 2 is a block diagram representation of a servo circuit of the disc drive of FIG. 1, used to selectively control the position of each of the heads with respect to the corresponding disc surface.

Referring to FIG. 2, shown therein is a functional block diagram of a servo circuit 130 used to effect head positional control for each of the heads 120 with respect to the corresponding disc surfaces. Servo data are transduced from the disc surface and, after preamplification by a preamp/driver circuit 132 (also shown in FIG. 1 to be mounted to the flex circuit board 124), are passed to a demodulator circuit 134 (demod) which conditions the burst signals for presentation to a digital signal processor 136 (DSP). The DSP 136 operates in accordance with programming steps stored in DSP memory 138 and commands issued by a top-level disc drive processor (not shown) to output current command signals to a coil driver 140, which applies current to the coil 113 to position the head as desired.

Figure 3:
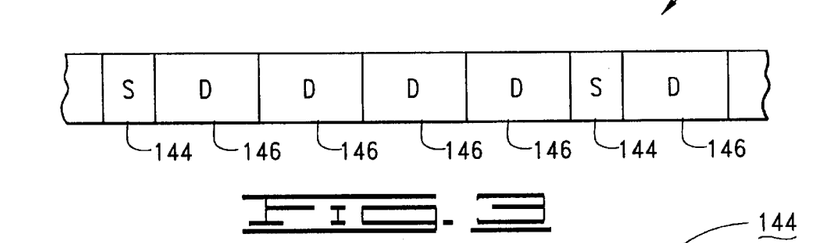
FIG. 3 represents a portion of a data track, illustrating the general manner in which both servo data fields and user data fields are arranged on each of the disc surfaces.

FIG. 3 represents a portion of a data track 142, illustrating the general manner in which both servo data fields 144 and user data fields 146 are arranged on each of the disc surfaces. The servo data fields 144 store data used by the servo circuit 130 and are arranged on the disc surfaces as a series of radially extending wedges, like spokes of a wheel. The servo data fields are written during a servo track writing (STW) operation during disc drive manufacturing. The user data fields 146 store data supplied by a user of a host computer in which the disc drive 100 is mounted and are defined during a disc drive formatting operation. It will be apparent that the definition of user data fields 146 between successive servo data fields 144 is in accordance with an embedded servo scheme so that the servo data are embedded within the user data and both appear on each track, although the present invention as claimed below is not so limited.

Figure 4:
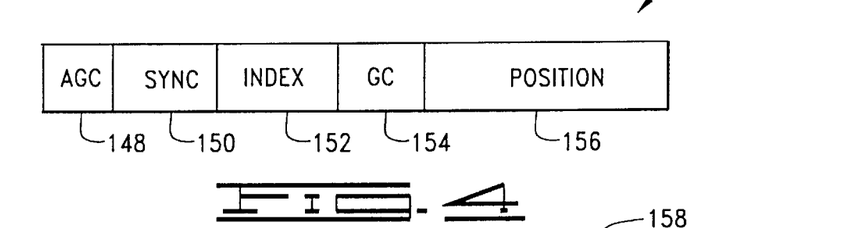
FIG. 4 provides a representation of the format of each of the servo data fields of FIG. 3.

FIG. 4 provides a representation of the general format of each of the servo data fields 144 of FIG. 3. An automatic gain control (AGC) field 148 stores an oscillating pattern (such as a 2T pattern) to prepare the servo circuit 130 (FIG. 2) for receipt of remaining portions of the servo data field 144. A synchronization (sync) field 150 provides timing information to the servo circuit 144. Index and Gray code fields 152, 154 respectively, indicate angular and radial position of the servo field 144. A position field 156 provides inter-track positioning information, as set forth more fully in FIG. 5.

Figure 5:
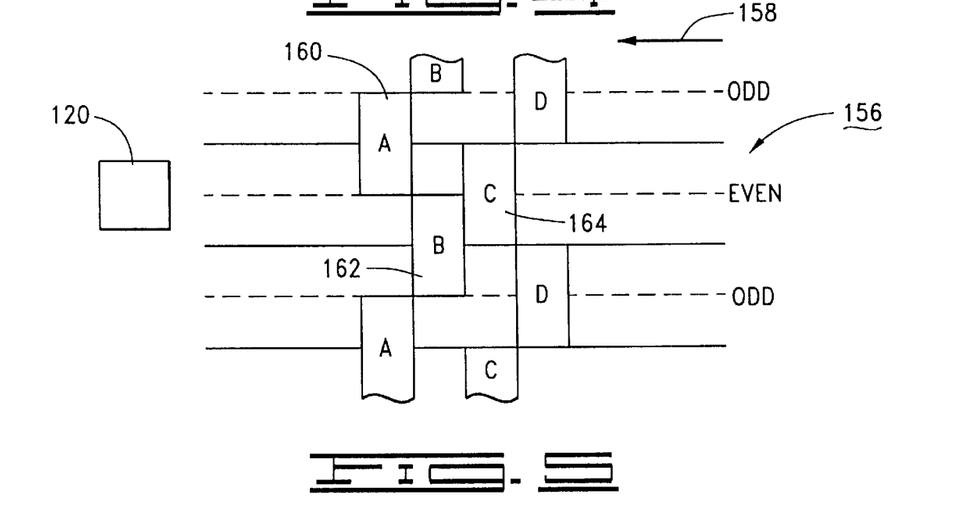
FIG. 5 illustrates the format of the position field of FIG. 4, showing the general arrangement of quadrature burst patterns which enable the servo circuit to effect inter-track head positional control.

FIG. 5 shows the arrangement of a series of A, B, C, and D burst patterns which serve to define the tracks 142 of the disc surfaces. The A and B burst patterns nominally extend from and between adjacent track centers and the C and D burst patterns nominally extend from and between adjacent track boundaries. For reference, tracks having C burst patterns are referred to as "even" tracks and tracks having D burst patterns are referred to as "odd" tracks.

During operation, as the patterns approach the selected head 120 in the direction of disc rotation as indicated by arrow 158, the head will transduce the magnetization of the associated A burst pattern (identified at 160), B burst pattern (identified at 162) and C pattern (identified at 164). By sampling and combining the respective burst signals, the servo circuit 130 can determine the apparent location of the head 120 and adjust the position accordingly. Although a quadrature servo pattern is shown in FIG. 5, it will be understood that such is merely for purposes of illustration and is not limiting to the scope of the claimed invention.

Figure 6:
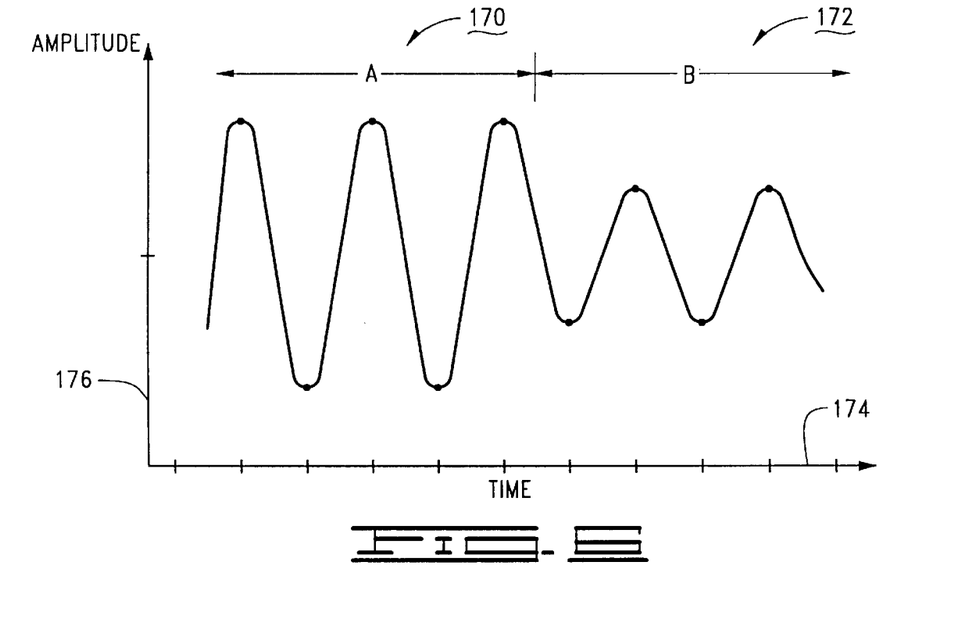
FIG. 6 is a graphical representation of ideal servo burst signals obtained as a selected head passes over portions of selected A and B burst patterns of FIG. 5.

FIG. 6 presents a graphical representation of ideal servo burst signals obtained as the head 120 passes over portions of selected A and B burst patterns, such as the patterns 160 and 162 of FIG. 5. More particularly, FIG. 6 shows a portion of an A burst signal 170 followed by a portion of a B burst signal 172, plotted against an x-axis 174 indicative of time and a y-axis 176 indicative of signal amplitude. The peak amplitudes of the signals 170, 172 are sampled at a determined sampling frequency, as shown.

By way of illustration, if the A burst signal 170 of FIG. 6 is normalized over a range from −1 to +1, then the following sequence of servo burst amplitude samples, denoted as $\{X_n\}$, can be expressed as:

$$\{X_n\}=\{+1, -1, +1, -1, +1\} \tag{1}$$

A corresponding sequence of differences between successive servo burst amplitude samples, $\{\Delta X_n\}$, determined as the difference between the absolute values of successive samples, results in the following set:

$$\{\Delta X_n\}=\{0, 0, 0, 0\} \tag{2}$$

Figure 7:
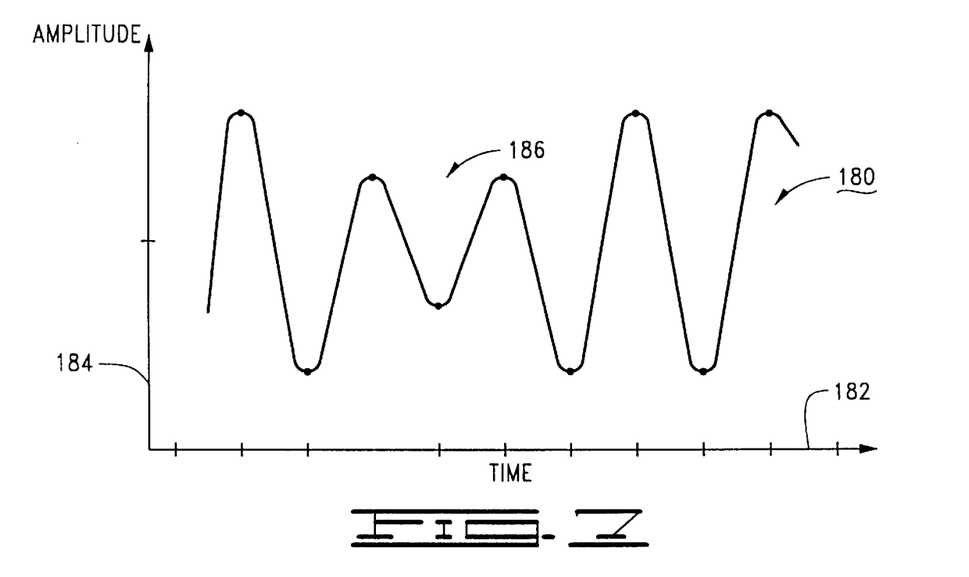
FIG. 7 is a graphical representation of a portion of a burst signal obtained from a selected burst pattern with a localized media anomaly.
Figure 8:
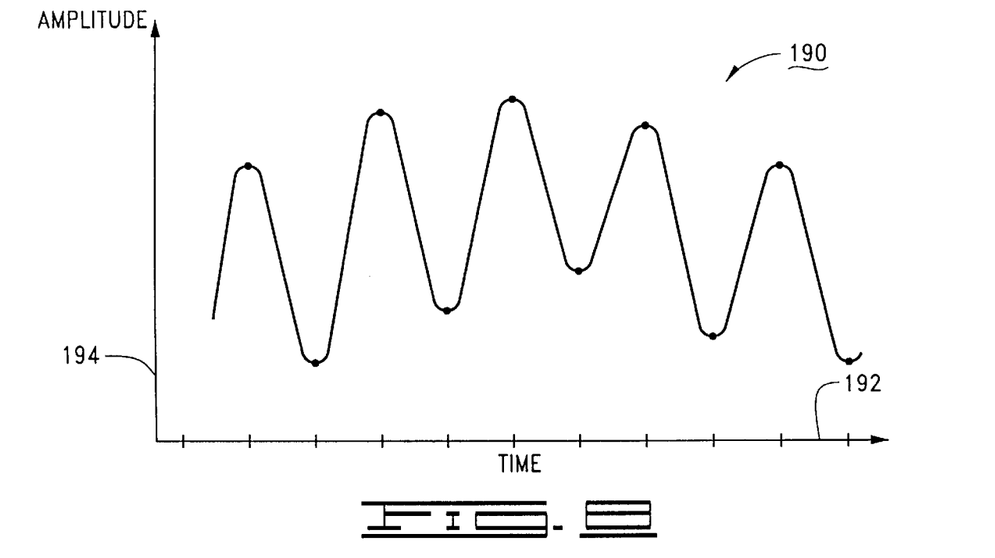
FIG. 8 is a graphical representation of a portion of a burst signal obtained from a selected burst pattern in the presence of a thermal asperity.

The difference set $\{\Delta X_n\}$ of equation (2) indicates the changes in slope of the sampled burst sequence of equation (1). It will be recognized that although FIG. 6 presents an ideal response, in reality factors such as noise will introduce random fluctuations in a sequence of burst samples, such as:

$$\{X_n\}=\{+1.05, -1.10, +0.95, -0.92, +1.04\} \tag{3}$$

yielding a corresponding difference set of:

$$\{\Delta X_n\}=\{0.05, -0.15, -0.03, 0.12\} \tag{4}$$

which is well controlled; the accumulated sum of such random variations will approach a value of zero (0) over time. However, defects such as media anomalies and thermal asperities do not provide such well controlled, random variations, as exemplified by FIGS. 7 and 8.

FIG. 7 is a graphical representation of a portion of a selected burst signal (whether A, B, C or D) read from a corresponding burst pattern at a location on the disc surface with a localized media anomaly. The signal, identified generally at 180 and plotted against a time x-axis 182 and an amplitude y-axis 184, includes a region 186 with a reduced amplitude response.

FIG. 8 is a graphical representation of a portion of a selected burst signal read from a corresponding burst pattern coincident with the occurrence of a thermal asperity. The signal, identified generally at 190 and plotted against time x-axis 192 and amplitude y-axis 194, undergoes a general increase in overall amplitude, as shown, for a duration of time corresponding to the thermal asperity event.

Figure 9:
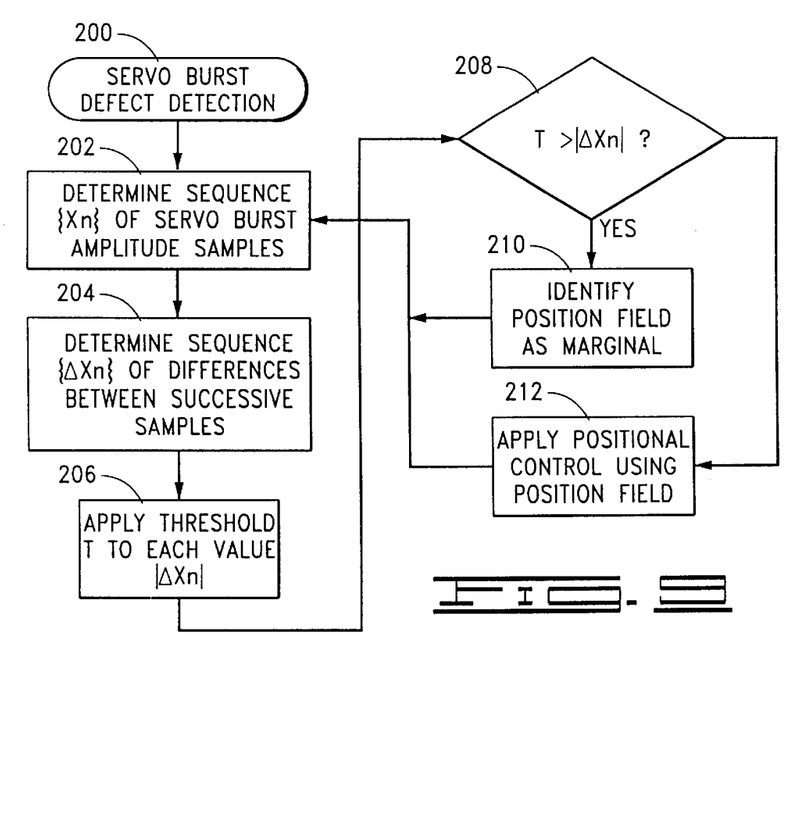
FIG. 9 is a flow chart for a SERVO BURST DEFECT DETECTION routine, illustrative of steps preferably carried out by the servo circuit of FIG. 2 to detect defective servo burst patterns in accordance with preferred embodiments of the present invention.

To detect defective servo burst patterns such as illustrated by FIGS. 7 and 8, FIG. 9 has been provided which sets forth a flow chart for a SERVO BURST DEFECT DETECTION routine 200, illustrative of steps preferably carried out by the servo circuit of FIG. 2 in accordance with preferred embodiments of the present invention. It will be understood that the routine of FIG. 9 is preferably performed during a track following mode of operation wherein the servo circuit operates to maintain a selected head 120 over a corresponding, selected track 142.

As shown at step 202, at such time that the selected head transduces the servo burst patterns associated with the selected track, the servo circuit determines a sequence $\{X_n\}$ of servo burst amplitude samples for each pattern, as discussed above. For example, the burst signal 180 of FIG. 7 would yield a normalized sequence having the following approximate values:

$$\{X_n\}=\{+1, -1, +0.5, -0.5, +0.5, -1, +1, -1, +1\} \quad (5)$$

and the burst signal 190 of FIG. 8 would yield a normalized sequence having the following approximate values:

$$\{X_n\}=\{+1, -1, +1.5, -0.5, +2.2, 0, +1.4, -0.7, +1, -1\}. \quad (6)$$

Next, as shown by step 204 of FIG. 9, for each sequence $\{X_n\}$ determined in step 202 the servo circuit 130 determines a corresponding difference sequence $\{\Delta X_n\}$ in relation to the difference between absolute values of successive servo burst samples. For FIG. 7, this operation would result in the following approximate values:

$$\{\Delta X_n\}\uparrow\{0, +0.5, 0, 0, -0.5, 0, 0, 0\} \quad (7)$$

and for FIG. 8, this operation would result in the following approximate values:

$$\{\Delta X_n\}=\{0, -0.5, +1, -1.7, +2.2, -1.4, +0.7, -0.3, 0\}. \quad (8)$$

A defect threshold, T, is next applied to each value $\Delta Xn$ at step 206. The value of the defect threshold T is selected based on the requirements of a given application; for example, a value for T of about 0.3 would be adequate to identify the defective burst signals of FIGS. 7 and 8, while at the same time passing the random noise fluctuations for the burst signal described by equations (3) and (4).

Thus, as shown by steps 208 and 210, the servo circuit 130 (FIG. 2) would not utilize the marginal servo burst signals of FIGS. 7 and 8 in calculating a correction signal to adjust the position of the selected head 120, whereas, as shown by steps 208 and 212, the servo circuit 130 would proceed to use the burst signal described by equations (3) and (4) to effect head positional control.

Additional operations by the servo circuit are contemplated at step 210 as well, including performing a reread operation on the associated servo position field 156 to determine whether the defect is repeatable (i.e., a hard error). The servo circuit 130 can also take steps to mark the servo pattern associated with the defective servo burst as defective so that the servo circuit ignores the position information obtained therefrom in the future. Once qualification of the most recently received set of servo burst signals is completed, the routine returns to step 202 for evaluation of the next servo burst signals on the selected track.

An important advantage of the routine of FIG. 9 is that servo defect qualification can be efficiently carried out based on relative differences between absolute values of successive servo burst signals, with low sensitivity to the particular placement of the head with respect to the track and the presence of random noise. The threshold selected at step 206 can be a fixed value, or can alternatively be adaptively adjusted to reflect a percentage of the accumulated peak-to-peak range of the servo burst signals.

Moreover, although the foregoing discussion has contemplated performing the routine of FIG. 9 during track following, it is contemplated that the routine can also be adapted for use during a seek wherein the head is swept across the disc surface from an initial track to a destination track. Although velocity control is usually used for seeks above a selected distance (such as 100 tracks), the position fields 156 can still be transduced by the selected head during the seek. In such a case, the servo burst amplitudes should monotonically increase or decrease in the direction of the seek, and the rate of change of the values can also be monitored in a similar manner as discussed above to detect defective position fields in intermediate tracks.

In view of the foregoing, it will now be recognized that the present invention is directed to a method and apparatus for improving operational performance of a disc drive by identifying defective servo burst patterns. In accordance with preferred embodiments, a disc drive 100 comprises a head 120 supported adjacent a surface of a rotatable disc 106 on which servo data 144 are stored, the servo data including a plurality of servo burst patterns 160, 162, 164 which define a plurality of tracks 142.

A servo circuit 130, responsive to the head, controllably positions the head with respect to the surface of the disc in relation to a position error signal determined from a selected combination of burst signals transduced from the servo burst patterns. The servo circuit identifies a selected servo burst pattern as defective in relation to differences between absolute values of successive pairs of peak amplitude samples from the burst signal obtained from the selected servo burst pattern.

The servo circuit preferably comprises a servo processor 136 (such as a digital signal processor) having associated programming to determine a sequence of the peak amplitude samples from the burst signal; determine a sequence of difference values in relation to differences between absolute values of successive pairs of the peak amplitude samples; and compare the sequence of difference values to a defect threshold, wherein the servo processor identifies the selected servo burst pattern as defective when at least one of the difference values exceeds the defect threshold.

The defect threshold is preferably provided with a magnitude to differentiate between burst signals with random noise fluctuations, and burst signals affected by a thermal asperity or localized media anomaly in the associated servo burst pattern.

Consistent with the foregoing discussion, for purposes of the appended claims the phrase "servo burst pattern" will be defined as data written to a disc to provide inter-track head positional control in relation to peak amplitudes of a burst signal transduced therefrom, such as the A, B, C and D burst patterns of FIG. 5, and will not be read to encompass other types of servo data such as the AGC, sync, index and Gray code fields 148, 150, 152 and 154 of FIG. 4, or the user data fields 146 of FIG. 3. Method steps have been set forth in a particular order, but the scope of the claim will not be limited to such order, unless otherwise specifically indicated.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. In a disc drive having a rotatable disc on which servo data are stored to enable a servo circuit of the disc drive to position a head relative to the disc, the servo data including a position field comprising a plurality of burst patterns from which burst signals are transduced, the servo circuit sampling and combining the burst signals to generate a position error signal indicative of the position of the head with respect to a corresponding track, a method for detecting a defective burst pattern comprising steps of:

(a) determining a sequence of servo burst amplitude samples indicative of peak amplitudes of a servo burst signal obtained from a selected burst pattern;

(b) determining a sequence of difference values in relation to differences between absolute values of successive pairs of the servo burst amplitude samples from step (a);

(c) comparing the sequence of difference values to a defect threshold; and (d) identifying the selected burst pattern as defective when at least one of the difference values exceeds the defect threshold.

2. The method of claim 1, wherein the burst patterns comprise A, B, C and D burst patterns arranged in a quadrature pattern, and wherein the method of claim 1 is performed for each of the A, B, C and D burst patterns.

3. The method of claim 1, further comprising a step of:

(e) subsequently ignoring a servo burst signal transduced from the defective servo burst pattern when positioning the head relative to the disc.

4. The method of claim 1, wherein a magnitude of the defect threshold is selected to detect occurrence of a thermal asperity coincident with the selected burst pattern.

5. The method of claim 1, wherein a magnitude of the defect threshold is selected to detect occurrence of a localized media anomaly coincident with the selected burst pattern, the localized media anomaly adversely affecting a magnitude of at least a selected peak amplitude of the servo burst signal.

6. A disc drive, comprising:

a head supported adjacent a surface of a rotatable disc on which servo data are stored, the servo data including a plurality of servo burst patterns which define a plurality of tracks;

a servo circuit, responsive to the head, which controllably positions the head with respect to the surface of the disc in relation to a position error signal determined from a combination of burst signals transduced from the servo burst patterns, the servo circuit identifying a selected servo burst pattern as defective in relation to differences between absolute values of successive pairs of peak amplitude samples from the burst signal obtained from the selected servo burst pattern.

7. The disc drive of claim 6, wherein the servo circuit comprises a servo processor having associated programming to:

(a) determine a sequence of the peak amplitude samples from the burst signal;

(b) determine a sequence of difference values in relation to differences between absolute values of successive pairs of the peak amplitude samples; and (c) compare the sequence of difference values to a defect threshold, wherein the servo processor identifies the selected servo burst pattern as defective when at least one of the difference values exceeds the defect threshold.

8. The disc drive of claim 7, wherein the head comprises a magneto-resistive read element and wherein a magnitude of the defect threshold is selected to detect occurrence of a thermal asperity coincident with the selected burst pattern.

9. The disc drive of claim 7, wherein a magnitude of the defect threshold is selected to detect occurrence of a localized media anomaly coincident with the selected servo burst pattern, the localized media anomaly adversely affecting a magnitude of at least a selected peak amplitude sample of the burst signal.

10. The disc drive of claim 6, wherein the servo circuit further subsequently ignores a burst signal transduced from a defective servo burst pattern when positioning the head relative to the disc.

11. A disc drive, comprising:

a head supported adjacent a surface of a rotatable disc on which servo data are stored, the servo data including a plurality of servo burst patterns which define a plurality of tracks; and defect detection means for detecting a defective servo burst pattern in relation to a burst signal transduced by the head solely from said defective servo burst pattern.

12. The disc drive of claim 11, wherein the defect detection means comprises a servo circuit which detects the defective servo burst pattern in relation to differences between absolute values of successive pairs of peak amplitude samples from the burst signal.

* * * * *

UNITED STATES PATENT AND TRADEMARK OFFICE
CERTIFICATE OF CORRECTION

PATENT NO. : 6,611,397 B1
DATED : August 26, 2003
INVENTOR(S) : Hieu V. Nguyen It is certified that error appears in the above-identified patent and that said Letters Patent is hereby corrected as shown below:

<u>Column 7,</u>
Line 26, replace "$\{\Delta X_n\}$ ↑ $\{0, +0.5, 0, 0, -0.5, 0, 0, 0\}$" with
-- $\{\Delta X_n\} = \{0, +0.5, 0, 0, -0.5, 0, 0, 0\}$ --

Signed and Sealed this

Thirtieth Day of March, 2004

JON W. DUDAS
*Acting Director of the United States Patent and Trademark Office*